United States Patent [19]
Wiebe et al.
[11] 3,821,652
[45] June 28, 1974

[54] SQUARE TO SINE CONVERTER

[75] Inventors: Harold Wiebe, Sharonville; Robert G. Wise, Loveland, both of Ohio

[73] Assignee: Cincinnati Milacron Inc., Cincinnati, Ohio

[22] Filed: Aug. 14, 1972

[21] Appl. No.: 280,725

[52] U.S. Cl. .................. 328/27, 328/155, 307/229, 307/260
[51] Int. Cl. .............................. H03k 5/08
[58] Field of Search ....... 328/13, 27, 155, 151, 162; 307/260, 60, 295, 229; 331/10; 323/101

[56] References Cited
UNITED STATES PATENTS 3,139,537 6/1964 Secretan ........................ 307/260
3,436,647 4/1969 Gobeli et al. ..................... 323/101
3,525,052 9/1970 Clark ............................. 328/162

*Primary Examiner*—Rudolph V. Rolinec
*Assistant Examiner*—B. P. Davis

[57] ABSTRACT

An apparatus is disclosed for converting a square wave signal to a sine wave signal wherein said sine wave signal maintains a fixed predetermined phase relation to the square wave signal. A feedback circuit is provided which samples the sine wave signal as a function of the square wave signal and produces a correction signal representing the phase relation therebetween. A sine wave generator is responsive to the square wave signal and the correction signal for producing the sine wave signal in a fixed predetermined phase relation to the square wave signal.

9 Claims, 5 Drawing Figures

SQUARE TO SINE CONVERTER

BACKGROUND OF THE INVENTION

The invention relates generally to the area of sine wave generators; and specifically, the invention provides a square-to-sine converter wherein the sine wave signal maintains a very stable phase relationship to the input square wave signal.

Typically, traditional sine to square converters use some type of filter network. Generally an active filter is used to generate the sine wave; however, such devices are very sensitive to environmental changes. Further, discrete component variations within the manufacturer's tolerance, will cause phase changes in the output sine wave signal. Consequently, to keep a circuit operative within specifications, either a continuous monitoring and tuning of the circuit is required; or the circuit must be assembled by hand-choosing the components and then operated within a carefully controlled environment.

The above problems are particularly acute when one attempts to generate a plurality of sine waves having a predetermined fixed phase relationship between them. Although the specification primarily discloses a single converter circuit, a plurality of circuits may be used to generate a number of phase related output sine wave signals.

As is well-known to those who are skilled in the art, one square wave signal may be split into a plurality of other square wave signals having predetermined phase relationships. A converter circuit may be employed for each of the other square wave signals and a plurality of sine wave signals will be generated. These sine wave signals will maintain a stable phase relationship independent of discrete circuit component changes within the manufacturer's tolerance and changes in the circuit components due to environmental changes.

SUMMARY OF THE INVENTION

In accordance with one aspect of the invention, applicants provide an apparatus for converting a square wave signal to a sine wave signal. The apparatus comprises a means for shifting the square wave signal 90° in phase. Next, a means, which has inputs responsive to the square wave signal and the sine wave signal, is operative for producing a correction signal representing the phase relationship between its inputs. Finally, a means connected to the shifting means and the producing means generates the sine wave signal in a predetermined phase relationship to the square wave signal.

DESCRIPTION OF THE PREFERRED EMBODIMENT

Figure 1:
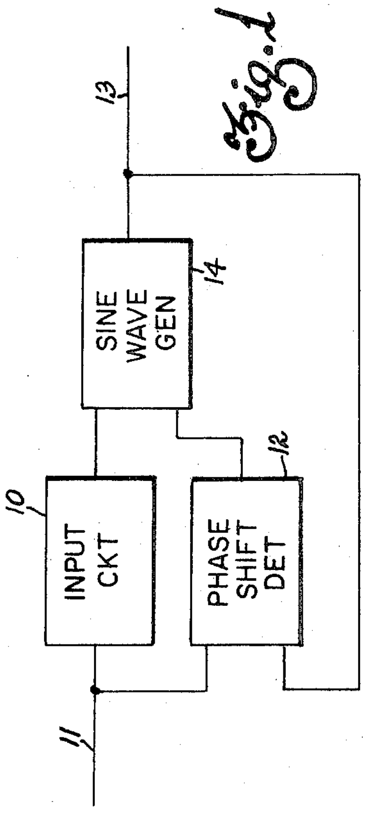
FIG. 1 is a general block diagram illustrating applicants' square to sine converter.

FIG. 1 is a general block diagram of applicants' invention. An input circuit 10 is responsive to a square wave signal on line 11 for shifting the phase of the square wave signal 90°. A phase shift detector 12 is responsive to the square wave signal and an output sine wave signal on line 13 for producing a correction signal representing the phase relationship between the square wave signal and the sine wave signal. A sine wave generator 14 is responsive to the phase shifted signal from the input circuit 10 and the correction signal for producing the output sine wave signal in a predetermined phase relationship to the square wave signal. Further, the sine wave generator 14 is operative to maintain said phase relationship in response to the correction signal independent of changes in specifications within the circuit components. Therefore, after initial set-up, applicants' circuit should not require extensive tuning during use.

Figure 2:
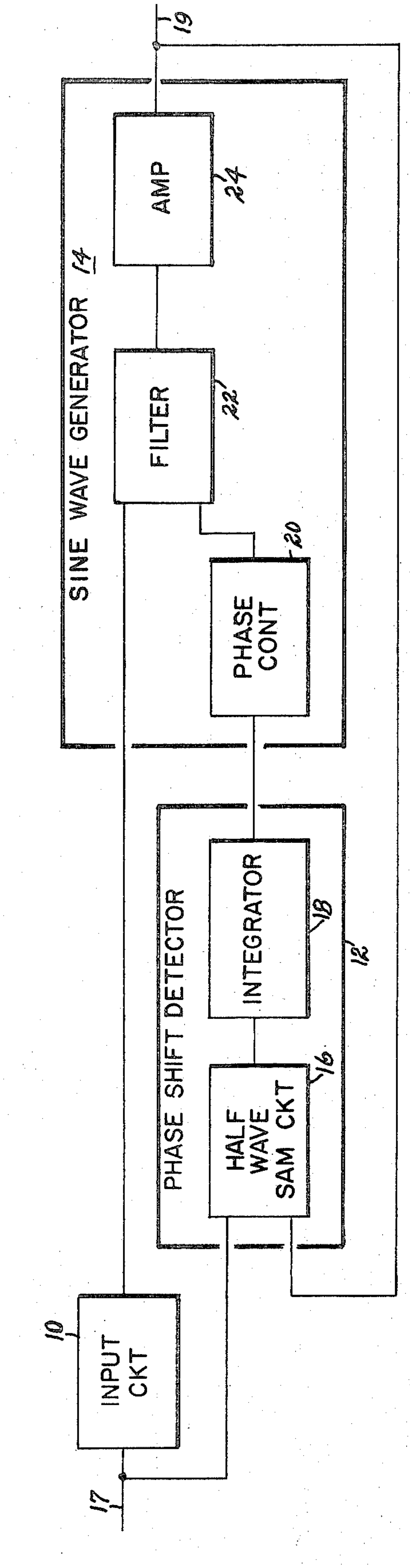
FIG. 2 is a detailed block diagram illustrating one embodiment of the square to sine converter.

FIG. 2 is a detailed block diagram illustrating one embodiment of the invention. The phase shift detector 12 is comprised of a half-wave sample circuit 16 and an integrator circuit 18. The half-wave sample circuit 16 is responsive to the square wave signal on line 17 for sampling the output sine wave signal on line 19 over one-half of its period. Under ideal conditions, the sample period is defined by the square wave signal as being between the opposite peak values of the output sine wave signal; therefore, during the sample time, the average value of the output sine wave signal is zero. An integrator circuit 18 is connected to the sampling circuit 16 and produces a correction signal in response to the sampling process. Therefore, the correction signal represents the phase relationship between the square wave signal and the output sine wave signal.

The sine wave generator 14 is connected to the input circuit 10 and the phase shift detector 12 and contains a filter circuit 22 for producing a sine wave signal in response to the phase shifted square wave signal. A phase shift control circuit 20 is responsive to the correction signal to produce a control signal to the filter circuit 22. The control signal is operative to control the phase shift in the filter circuit 22. Finally, an amplifier circuit 24 is connected to the filter circuit 22 for providing the output sine wave signal having a predetermined fixed phase relationship to the square wave signal. In summary, when the phase of the output sine wave signal changes, the half-wave sample circuit 16 will produce a non-zero output signal. With respect to the square wave signal, this non-zero output signal is reflected in the correction signal which causes the control signal to generate an appropriate phase shift in the filter circuit 22 thereby bringing the output of the half-wave sample circuit 16 back to its zero value.

Figure 3:
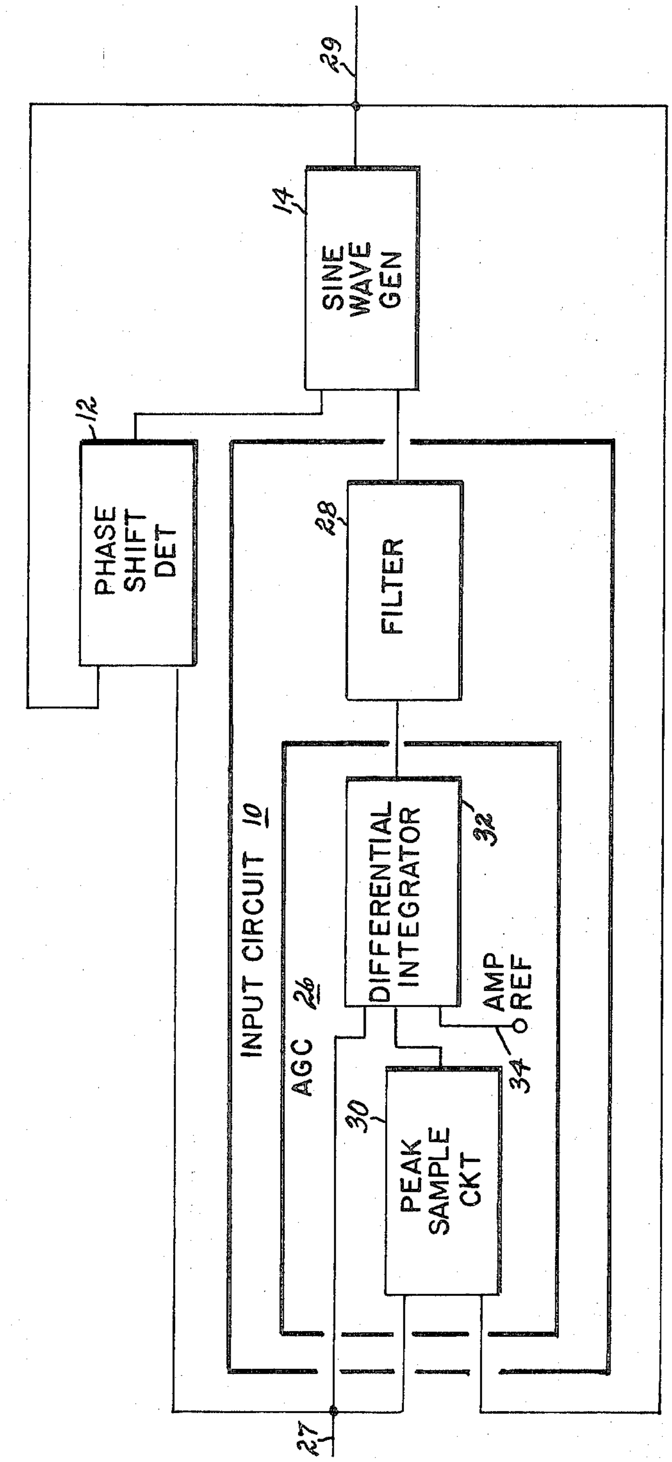
FIG. 3 is a detailed block diagram illustrating a second embodiment of the square to sine converter.

FIG. 3 is a detailed block diagram of another embodiment of the invention. The input circuit 10 is comprised of a filter 28 and an automatic gain control (AGC) 26. The AGC 26 is responsive to a square wave signal on line 27 and a sine wave signal on line 29 for controlling the amplitude of the sine wave signal according to a predetermined amplitude reference. The filter 28 is responsive to the square wave signal for shifting the phase thereof 90°. The filter 28 is also operative to remove undesirable harmonics from the square wave signal. The phase shift detector 12 and sine wave generator 14 operate in the manner earlier described.

The AGC circuit 26 is comprised of a peak sample circuit 30 and a differential integrator 32. The peak sample circuit 30 is responsive to the square wave signal for sampling a peak value of the sine wave signal. The differential integrator 32 is connected to the peak sample circuit 30 and is responsive thereto for changing the amplitude of the square wave signal in accordance with a predetermined amplitude reference signal on an input 34.

Figure 4:
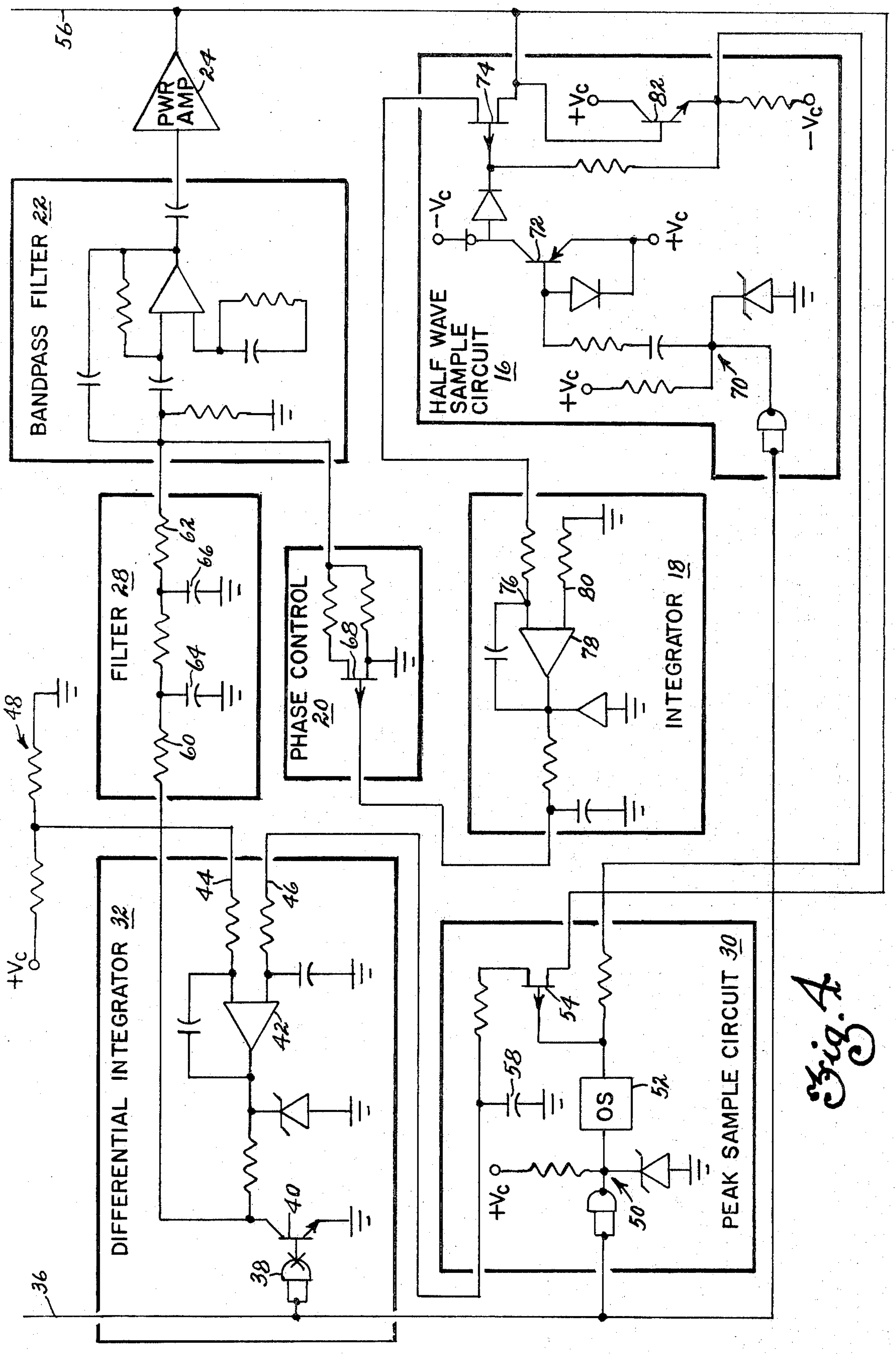
FIG. 4 is a detailed schematic diagram of a combination of both the first and second embodiments.

FIG. 4 is a schematic diagram illustrating a combination of the embodiments discussed in FIGS. 2 and 3. Within the differential integrator 32, a logic element 38 and transistor 40 represent elements of a commerically available interface between the digital circuits producing the square wave signal on line 36 and the elements comprising the AGC. The differential integrator further includes a differential amplifier 42 responsive to a difference between its inputs 44 and 46. The input 44 is connected to an amplitude reference signal derived from a resistor divider network at 48. The input 46 is connected to a peak sample circuit 30. Within the peak sample circuit 30, an inverter and driver stage 50 receives the square wave input signal and drives a monostable multivibrator 52. The multivibrator 52 produces a sampling pulse to an FET 54 which samples an output sine wave signal on line 56.

As earlier described, the filter network 28 is operative to shift the phase of the square wave signal 90°; hence, the output sine wave signal is 90° out of phase with respect to the square wave signal. Therefore the multivibrator 52 operating in response to the square wave signal will produce a sample pulse at the peak value of the output sine wave signal. This peak value is stored in capacitor 58 and reflected to the input 46 of the amplifier 42 for comparison with the amplitude reference on the input 44. Therefore, the integrator 32 adjusts the amplitude of the square wave signal to maintain the amplitude of the output sine wave signal at a predetermined reference.

The square wave signal passes through the AGC circuit and into a filter network 28. The filter network 28 is comprised of resistors 60 and 62 and capacitors 64 and 66. The purpose of the filter network is to shift the phase of the square wave signal 90° and also to remove undesirable harmonics. The phase shifted square wave signal is an input to a voltage controlled bandpass filter 22 which is operative to generate a sine wave signal. The bandpass filter is responsive to a phase control 20 which operates as a variable resistance controlled by an FET 68. The FET 68 is responsive to the half-wave sample circuit 16 for varying the resistance of the input of the bandpass filter 22. This variable resistance is operative to generate a phase shift on an output of the filter 22.

The half-wave sample circuit 16 contains an inverter and driver stage at 70. A transistor 72 is responsive to the square wave signal and is turned on over one-half of a period thereof. An FET 74 is responsive to the transistor 72 and samples the output sine wave signal over one-half of the period of the square wave signal. Once again, since the output sine wave signal is 90° out of phase with the square wave signal, the sampling will occur between opposite peak values of the output sine wave signal. The sampled signal is connected to an input 76 of a differential amplifier 78 contained in an integrator 18. The other input 80 is connected to a ground and represents a zero reference signal. If the output sine wave signal maintains the ideal phase relationship to the square wave signal, i.e. a 90 degree phase shift, the average value between the opposite peak to peak sample is zero. Therefore, the signal produced by the integrator will maintain the resistance of phase control circuit constant; however, if the output sine wave signal shifts in phase from its ideal relationship to the square wave signal, the average value over the opposite peak to peak sample will not be zero. Consequently, the integrator 18 will produce an output signal to the phase control 20 which is operative to change the value of the resistance of the phase control 20. This change in resistance on the input of the bandpass filter 22 is operative to generate a phase shift therein, thereby bringing the output sine wave signal back into its ideal phase relationship with respect to the square wave signal. The sine wave signal generated by the bandpass filter 22 passes through a buffer power amplifier 24 which is a low distortion amplifier having a low DC offset. The purpose of the amplifier 24 is to provide the necessary power required by whatever load is used.

Figure 5:
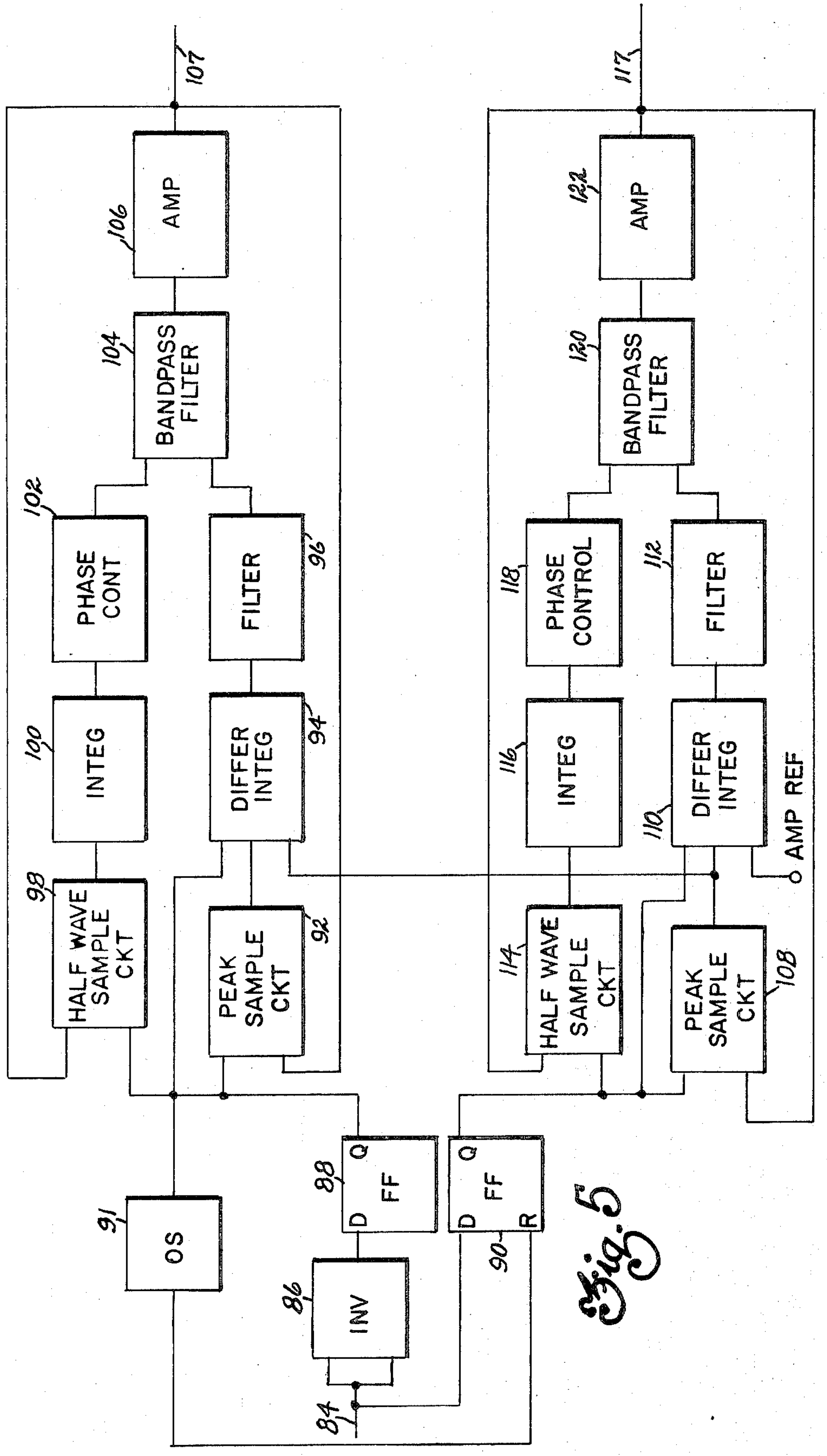
FIG. 5 illustrates how a plurality of converter circuits may be used to generate a plurality phase related sine wave signals.

FIG. 5 illustrates how a plurality of converter circuits may be used to generate a plurality of sine wave signals having a predetermined phase relation between them. The purpose of the circuit in FIG. 5 is to generate two sine waves having a 90 degree phase shift therebetween. A square wave signal on input line 84 passes through an inverter 86 and a flip-flop 88 which operates to divide the frequency of the square wave input by two. The square wave input also passes through flip-flop 90 to produce a signal having a frequency equal to one-half the frequency of the signal on the input 84. A mono-stable multivibrator 91 is responsive to the flip-flop 88 to provide a reset for the flip-flop 90. Consequently, the square wave signals from the flip-flops 88 and 90 are 90° out of phase with each other. A first converter circuit has an input circuit comprised of a peak sample circuit 92, a differential integrator 94, and a filter 96. Next, a phase shift detector is comprised of a half-wave sample circuit 98 and an integrator 100. Finally, a sine wave generator comprised a phase control 102, of a bandpass filter 104 and an amplifier 106 is responsive to the input circuit and the phase shift detector for producing a sine wave signal on line 107 which has a very stable phase relationship with respect to its corresponding input square wave signal. A second converter circuit has an input circuit comprised of a peak sample circuit 108, a differential integrator 110, and a filter 112. In addition, a phase detector comprised of a half-wave sample circuit 114 and integrator 116, represents a feedback circuit for controlling the phase in the sine wave generator comprised of a phase control 118, a bandpass filter 120 and an amplifier 122. Again, the second converter circuit will produce a sine wave signal on line 117 having a very stable phase relationship with its corresponding input and will be 90° out of phase with the sine wave produced by the first converter circuit. It should be noted that the amplitude reference for the differential integrator 110 in the second converter circuit is obtained as described in FIG. 4. However, the amplitude reference in the differential integrator 94 of the first converter circuit is derived from the output of the peak sample circuit 108 in the second converter circuit. Consequently, the amplitude of the sine wave signal produced by the first converter circuit will always follow the amplitude of the sine wave signal produced by the second converter circuit. Therefore, not only are the sine wave signals produced by the converter circuits fixed in phase with respect to each other; but they are also fixed in amplitude.

While the invention has been illustrated in some detail according to the preferred embodiments shown in the accompanying drawings, and while the preferred illustrated embodiments have been described in some detail, there is no intention to limit the invention to such detail. On the contrary, it is intended to all modifications, alterations, and equivalents falling within the spirit and scope of the appended claims.

What we claim is:

1. An apparatus for converting a square wave signal to a sine wave signal having a predetermined fixed phase shift with respect to the square wave signal, the apparatus comprising:

a. means responsive to the square wave signal for shifting the phase of the square wave signal an amount equal to the predetermined fixed phase shift;

b. means having an input connected to the shifting means for generating the sine wave signal having the predetermined fixed phase shift with respect to the square wave signal; and c. means having inputs responsive to the shifting means and the generating means and an output connected to another input of the generating means for sampling the sine wave signal as a function of the square wave signal to produce a correction signal in response to any change in phase from the predetermined fixed phase shift between the inputs, whereby said correction signal causes the generating means to maintain the predetermined fixed phase shift between the sine wave signal and the square wave signal.

2. An apparatus for converting a plurality of input square wave signals having predetermined phase differences therebetween to a plurality of output sine wave signals, said sine wave signals having phase differences therebetween corresponding to the phase differences between the input square wave signals, and further each sine wave signal having a predetermined fixed phase shift with respect to a corresponding input square wave signal, the apparatus comprising:

a. a plurality of input circuits, each of said input circuits being responsive to an input square wave signal for shifting the phase of said input square wave signal an amount equal to the predetermined fixed phase shift;

b. a plurality of sine wave generators, each of said sine wave generators having an input connected to one of the shifting means and generating an output sine wave signal having the predetermined fixed phase shift with respect to a corresponding input square wave signal; and c. a plurality of sample circuits, each of said sample circuits having inputs responsive to one of the input square wave signals and one of the output sine wave signals and an output connected to another input of a corresponding generating means and sampling the sine wave signal as a function of the input square wave signal to produce a correction signal in response to any deviation in phase from the predetermined fixed phase shift between the inputs whereby said correction signal causes the corresponding generating means to maintain said predetermined fixed phase shift between the one of the output sine wave signals and the one of the input square wave signals.

3. The apparatus of claim 2, further comprising a plurality of gain control circuits, each gain control circuit being responsive to an input square wave signal, a corresponding output sine wave signal and a reference signal for maintaining the magnitude of the output sine wave signal approximately equal to the magnitude of the reference signal.

4. An apparatus for converting a square wave signal to an output sine wave signal having a 90° phase shift with respect to said square wave signal, the apparatus comprising:

a. means responsive to the square wave signal for shifting the phase of the square wave signal ninety degrees;

b. means having an input responsive to the shifting means for generating the output sine wave signal ninety degrees out-of-phase with respect to the square wave signal;

c. means responsive to the square wave signal and the output sine wave signal for sampling the output sine wave signal as a function of the square wave signal; and d. means responsive to the sampling means and having an output connected to another input of the generating means for producing a correction signal in response to any phase deviation from the 90 degree phase difference between the square wave signal and the output sine wave signal, whereby said correction signal causes the generating means to maintain the 90 degree difference between the square wave signal and the output sine wave signal.

5. The apparatus of claim 4, wherein the sampling means comprises means responsive to opposite transitions of the square wave signal for producing a signal representing the average value of one-half of a period of the output sine wave signal.

6. An apparatus for converting an input square wave signal to an output sine wave signal 90° out-of-phase with respect to said input square wave signal, the apparatus comprising:

a. means responsive to the input square wave signal for shifting the phase of the input square wave signal 90°;

b. means responsive to the shifting means for generating a sine wave signal 90° out-of-phase with respect to the input square wave signal;

c. means connected to the generating means for providing the output sine wave signal;

d. means having inputs responsive to the input square wave signal and the output sine wave signal for sampling the output sine wave signal as a function of the input square wave signal to produce a correction signal in response to any change in the ninety degrees phase difference between the inputs;

e. means connected between the sampling means and the generating means for controlling the phase of the sine wave signal as a function of the correction signal.

7. An apparatus for converting an input square wave signal to an output sine wave signal ninety degrees out-of-phase with respect to the input square wave signal, the apparatus comprising:

a means having first and second inputs for generating the output sine wave signal 90° out-of-phase with respect to the input square wave signal;

b. means responsive to the input square wave signal and the output sine wave signal for maintaining the magnitude of the output sine wave signal approximately equal to the magnitude of a predetermined reference signal;

c. means connected to the maintaining means and having an output connected to the first input of the generating means for shifting the phase of the input square wave signal 90°; and d. means having inputs responsive to the input square wave signal and the output sine wave signal and an output connected to the second input of the generating means for sampling the output sine wave signal as a function of the input square wave signal to produce a correction signal in response to any deviation from the 90° phase difference between the inputs, whereby said correction signal causes the generating means to maintain the sine wave signal ninety degrees out-of-phase with respect to the input square wave signal.

8. The apparatus of claim 7, wherein the maintaining means comprises:

a. means responsive to the square wave signal and the output sine wave signal for sampling the peak magnitude of the output sine wave signal as a function of the square wave signal; and b. means responsive to the peak magnitude of the output sine wave signal and the square wave signal for adjusting the magnitude of the square wave signal to maintain the output sine wave signal at a predetermined reference magnitude.

9. An apparatus for converting an input square wave signal to an output sine wave signal 90° out-of-phase with respect to the input square wave signal, the apparatus comprising:

a. a band pass filter responsive to the input square wave signal for generating a sine wave signal 90° out-of-phase with respect to the input square wave signal;

b. an amplifier circuit connected to the band pass filter for producing an output sine wave signal 90° out-of-phase with respect to the input square wave signal;

c. a peak sample circuit responsive to the input square wave signal and the output sine wave signal for sampling the peak magnitude of the output sine wave signal;

d. a differential integrator responsive to the peak sample circuit and the input square wave signal for adjusting the magnitude of the input square wave signal to maintain the magnitude of the output sine wave signal at a predetermined reference magnitude;

e. a filter network connected between the differential integrator and the band pass filter for producing a phase shifted signal 90° out-of-phase with respect to the input square wave signal;

f. a half-wave sample circuit responsive to the input square wave signal and the output sine wave signal for sampling the output sine wave signal over one-half of a period of the input square wave signal; and g. an integrator connected to the half-wave sample circuit for producing a correction signal in response to any deviation from the 90° phase difference between the output sine wave signal and the input square wave signal; and h. a phase control connected between the integrator and the band pass filter for producing a control signal as a function of the correction signal, whereby said control signal causes the band pass filter to maintain the 90° phase difference between the output sine wave signal and the input square wave signal.

* * * * *